(12) United States Patent
Wisler et al.

(10) Patent No.: US 9,022,764 B2
(45) Date of Patent: May 5, 2015

(54) SYSTEM FOR MANUFACTURING AN IRRIGATION PIPE AND A DEVICE AND METHOD FOR DETECTING HOLES IN THE WALL OF AN IRRIGATION PIPE

(75) Inventors: Alain Wisler, Jongny (CH); Jean-Charles Zaramella, Pampigny (CH)

(73) Assignee: Maillefer S.A., Ecublens (CH)

( * ) Notice: Subject to any disclaimer, the term of this patent is extended or adjusted under 35 U.S.C. 154(b) by 0 days.

(21) Appl. No.: 14/116,173

(22) PCT Filed: May 24, 2012

(86) PCT No.: PCT/EP2012/059655
§ 371 (c)(1),
(2), (4) Date: Feb. 4, 2014

(87) PCT Pub. No.: WO2012/160121
PCT Pub. Date: Nov. 29, 2012

(65) Prior Publication Data
US 2014/0150509 A1 Jun. 5, 2014

(30) Foreign Application Priority Data

May 26, 2011 (CH) ................................. 900/2011

(51) Int. Cl.
*B29C 47/20* (2006.01)
*B29C 47/90* (2006.01)
(Continued)

(52) U.S. Cl.
CPC .............. *B21C 31/00* (2013.01); *B29C 47/8835* (2013.01); *B29C 47/901* (2013.01); *B29D 23/001* (2013.01); *G01M 3/083* (2013.01); *A01G 25/023* (2013.01); *B29C 47/0023* (2013.01); *B29C 47/903* (2013.01); *B29C 47/92* (2013.01);

(Continued)

(58) Field of Classification Search
USPC ............. 425/67, 71, 113, 114, 135, 136, 290, 425/296, 326.1, 377, 380, 461, 467; 264/40.1, 562, 178 R, 209.4, 209.5; 156/244.13, 244.14, 244.19, 500
See application file for complete search history.

(56) References Cited

U.S. PATENT DOCUMENTS 3,302,450 A * 2/1967 Wakar ............................ 73/45.5
7,530,382 B2 * 5/2009 Kertscher et al. ............. 156/497
(Continued)

FOREIGN PATENT DOCUMENTS

EP 0353982 A2 2/1990

OTHER PUBLICATIONS

International Search Report for PCT/EP2012/059655 dated Jun. 27, 2012.
(Continued)

*Primary Examiner* — Yogendra Gupta
*Assistant Examiner* — Joseph Leyson
(74) *Attorney, Agent, or Firm* — Pearne & Gordon LLP

(57) ABSTRACT

A system for manufacturing an irrigation pipe comprises an extrusion unit, a calibrator unit, a cooling unit for cooling the irrigation pipe in a cooling liquid, and a traction unit for drawing the irrigation pipe in the cooling unit. The cooling unit comprises a device for detecting holes in the wall of the irrigation pipe and arranged for being immersed in the cooling liquid. The device for detecting holes comprises at least one optical transmitter and at least one optical receiver which define an optical barrier. The device is arranged so that the holes in the irrigation pipe located below the device produce gas bubbles which modify the optical barrier.

14 Claims, 3 Drawing Sheets

(51) Int. Cl.
  *B21C 31/00* (2006.01)
  *B29C 47/88* (2006.01)
  *B29D 23/00* (2006.01)
  *G01M 3/08* (2006.01)
  *A01G 25/02* (2006.01)
  *B29C 47/00* (2006.01)
  *B29C 47/92* (2006.01)
  *F17D 5/00* (2006.01)
  *F16L 55/00* (2006.01)

(52) U.S. Cl.
  CPC ............... *B29C 2947/92228* (2013.01); *B29C 2947/92285* (2013.01); *B29C 2947/92295* (2013.01); *B29C 2947/92723* (2013.01); *B29C 2947/92942* (2013.01); *F17D 5/00* (2013.01); *F16L 55/00* (2013.01)

(56) References Cited

U.S. PATENT DOCUMENTS 8,475,617 B2 * 7/2013 Kertscher ............... 156/244.13
2006/0202381 A1 9/2006 Bach et al.

OTHER PUBLICATIONS

International Preliminary Report on Patentablity for PCT/EP2012/059655 dated May 13, 2013.

* cited by examiner

US 9,022,764 B2

SYSTEM FOR MANUFACTURING AN IRRIGATION PIPE AND A DEVICE AND METHOD FOR DETECTING HOLES IN THE WALL OF AN IRRIGATION PIPE

FIELD OF THE INVENTION

The present invention concerns a system for manufacturing an irrigation pipe, in particular a drip irrigation pipe, and a device and method for detecting holes in the wall of an irrigation pipe.

DESCRIPTION OF PRIOR ART

Some irrigation techniques use so-called "drip" irrigation pipes. The expression "drip irrigation pipe" indicates in this context an irrigation pipe, e.g. made of HDPE (High Density Polyethylene), pierced, at pre-determined intervals, by holes of small diameter, through which water can flow towards the ground. A dripper, which is a flow limiter, can be provided at each hole for precisely controlling the flow from the holes. It is generally made of plastic material and it is attached to the inner wall of the irrigation pipe during its manufacturing.

Since irrigation pipes have a fixed cross-sectional profile, an extrusion process is generally used for their manufacturing. A device for manufacturing irrigation pipes generally comprises an extrusion unit, a calibrator unit for regulating the diameter of the pipes, a cooling unit for cooling the pipe—comprising a liquid cooling tank which is some tens meters long and a cooling liquid, e.g. water, inside the tank—and a traction unit for drawing the pipe through the liquid cooling tank. The speed of the irrigation pipe inside the liquid cooling tank is generally higher than 100 m/min, e.g. 150 m/min.

The liquid cooling tank generally comprises a cover defining a cavity between the liquid and the cover, in which cavity a partial vacuum is created. Since the inner chamber of the pipe is subject to a gas pressure equal to the atmospheric pressure, the vacuum allows the tube to maintain the desired cylindrical shape during cooling.

The drippers can be regularly fed into the extrusion unit by a dripper insertion unit comprising orienting means for feeding the drippers to the extrusion unit along a determined orientation.

After the cooling tank, a perforating unit can be provided for making a hole on the wall of the pipe in correspondence of each dripper. Beyond the traction unit there is a winding unit for winding the pipe onto a spool.

The so produced irrigation pipes can comprise holes in their walls. The noun "hole" in this context designates a perforation and/or a crack. These holes can be formed for different reasons, e.g. the presence of dust in the extrusion unit, the inappropriate size of the carbon black present in the pipe material, the deposit of materials in the calibrator unit, faulty welding of the drippers, etc.

These holes have generally a diameter between 0.1 mm and 1 mm and can be undetectable by the naked eye. These defects often are revealed only after the irrigation pipes have been set in place on the ground.

EP1701147 describes a detection device for irrigation pipes including a camera which takes pictures of one area of the cooling fluid and an electronic analysing circuit which determines the presence of gas bubbles, e.g. air bubbles, from the images taken by the camera. In fact, if there are holes on the pipe, air bubbles will be released from the pipe due to the pressure difference between the chamber of the pipe and the vacuum outside of the pipe. The camera is placed outside the liquid cooling tank and it is not configured for being immersed in the cooling liquid.

The analysis circuit applies a processing algorithm to each picture taken by the camera and compares the image taken by the camera with a reference picture. From the differences between the specific picture and the reference picture, the presence of at least one gas bubble is inferred.

This solution is complicated and requires expensive electric components like a camera and a numerical control device executing the processing algorithm. The comparison of the pictures taken by the camera with the reference pictures cannot establish whether possible differences are caused by gas bubbles or some other effect. A transparent window has to be provided on the liquid cooling tank as well as means for cleaning the inner face of this transparent window to prevent the deposit of impurities on this inner face which could detract from the quality of the images taken by camera placed outside the cooling tank in correspondence of this window. Finally, lighting means for the cooling fluid have to be provided in order to ensure the quality of the images taken by the camera.

EP0353982 describes a device for creating a metallic pipe coated by a plastic layer and mentions, without details, the gas bubbles detection as a way for detecting pipe defects.

U.S. Pat. No. 3,383,906 describes a device for pneumatically testing the impermeability of a tube, by closing each of its ends and introducing compressed air into the tube. The tube is immersed in a tank full of water. This document only describes how to avoid turbulences in the water and does not specify how to perform the gas bubble detection. Moreover, the described device is not adapted to the domain of the system for extrusion pipes manufacturing. Finally, immersing a tube in the tank full of water creates unwanted bubbles on the tube surface which have to be distinguished from the bubbles caused by possible holes.

U.S. Pat. No. 5,651,999 describes an apparatus for testing extruded tubes by using a source of helium gas connected to the extrusion unit so that the helium gas is continuously introduced into the interior of the tube as it is formed during the extruding process. The extruded tube is passed through an elongated inspection housing. An annular chamber is formed between the tube and the interior of this inspection housing. A helium detector inside the annular chamber constantly monitors its atmosphere and, whenever helium is detected, it activates an alarm. This solution is complicated and expensive since it requires a source of helium gas, a helium detector and an annular chamber.

U.S. Pat. No. 4,854,158 describes a method for testing the presence of holes on a device like a fuel tank. The fuel tank is firstly pressurized with a gas and then submerged in the water of a tank. Also in this case immersing the fuel tank in the tank creates unwanted bubbles on the fuel tank surface which have to be distinguished from the bubbles caused by possible holes. The gas bubbles rising from the fuel tank are collected by using a bubble collector comprising several tilted panels having a plurality of grooves. As a bubble rises through a groove, it passes between a photocell and a light bulb, interrupting the light directed toward the photocell such that the bubble is detected by the photocell. The described system is not suitable for a continuous manufacturing process such as the extrusion of plastic pipes, wherein the irrigation pipe does not needed to be immersed in a liquid since it is already in the cooling liquid and it is not in a fixed position as the fuel tank of this document, but it is drawn by a traction unit. The photocells and the light bulbs have to be powered by electric leads immersed in the water, creating a possible electrical hazard in the case of a non perfect water tightness. Moreover the gas bubbles have to be conducted between a photocell and a light bulb by using the grooves of a collector, since the light beam between the photocell and the light bulb is not parallel to the water surface. Finally the system requires up to fifty photocells and light bulbs and is thus expensive.

A solution allowing the reduction and/or elimination of at least some of the mentioned drawbacks of the devices for detecting holes in the wall of an irrigation pipe of the prior art is needed.

BRIEF SUMMARY OF THE INVENTION

The aim of the present invention is to provide a system for manufacturing an irrigation pipe and a device and method for detecting holes in the wall of this irrigation pipe more simple and less expensive than the known devices for detecting holes and without immersed electric devices.

According to the invention, these aims are achieved by means of a system for manufacturing an irrigation pipe according to claim 1, by means of a device for detecting holes in the wall of an irrigation pipe according to the claims and by means of a method for detecting holes in the wall of an irrigation pipe according to the claims.

The system for manufacturing an irrigation pipe according to the invention comprises:
 an extrusion unit for extruding the irrigation pipe,
 a calibrator unit for regulating the diameter of the irrigation pipe,
 a cooling unit for cooling the irrigation pipe in a cooling liquid,
 a traction unit for drawing the irrigation pipe through the cooling unit.

The system for manufacturing an irrigation pipe advantageously comprises also a winding unit to wind the pipe onto a spool.

Advantageously the cooling unit comprises a device for detecting holes in the wall of the irrigation pipe and arranged for being immersed in the cooling liquid, this device for detecting holes comprising at least one optical transmitter and at least one optical receiver which both define an optical barrier there-between. This device is arranged so that the holes of the irrigation pipe being located below the device produce gas bubbles which modify the optical barrier.

In this context the expression "optical barrier" indicates a flat light beam generated by one or more optical transmitters and received by one or more optical receivers. The device for detecting holes according to the invention is arranged for being fully immersed in the cooling liquid.

In this context the expression "optical transmitter" indicates a transmitter whose input and output are both optical signals. Same considerations are valid for the optical receiver. In other words the optical transmitter and receiver do not comprise any electric component: the optical transmitter and receiver are devoid of electric components. They are therefore suitable to be submerged in the cooling liquid of the liquid cooling tank. The device for detecting holes is preferably placed in proximity to the calibrator, as will be discussed.

The optical barrier is generated below the level of the cooling liquid and above the pipe. The irrigation pipe, as discussed, is continuously produced and drawn by the traction unit. If the irrigation pipe comprises holes, gas bubbles released from the holes reach and cross the optical barrier; consequently they modify the light transmission characteristic of the optical barrier: in fact the gas bubbles act as diffraction lenses, and therefore the intensity of the received flat light beam is changed as the gas bubbles cross it.

Advantageously the optical transmitter and receiver are respectively connected to a first and second cable, each of this first and second cable comprising a beam of N optical fibers, N being an integer and positive number, e.g. N=20. In another embodiment, each of this first and second cable comprises a single optical fiber, in which different signals can be multiplexed by using WDM (Wavelength Division Multiplexing) techniques. The optical fiber or the beam of N optical fibers is arranged for conducting the light of a light source, e.g. a LED and/or a laser and/or an IR source.

The optical transmitter and receiver can have a parallelpipe shape and comprise a cable face opposite to the emitting respectively receiving face of an optical signal. The cable face comprises the connection to a first respectively second cable, the emitting respectively receiving face comprise one or more opening, the number of which corresponds to the number of optical fibers—or signals—of the first and second cables. In fact, if there are N optical fibers in the cables—or if there is a single optical fiber comprising N wavelengths—the optical transmitter and receiver will comprise N openings on the emitting respectively receiving face, one for each optical fiber. In the case of the single optical fiber comprising N wavelengths, the optical transmitter acts as a WDM demultiplexer which splits the N wavelengths into different signals corresponding to different wavelengths; the optical receiver acts as WDM multiplexer which joins together these signals. In one embodiment, the optical transmitter and receiver comprise optical components, i.e. lens, mirrors, etc, for improving the transmission and/or the reception of the optical barrier if, for example, their distance is higher than some limiting value.

The second cable can connect the optical receiver to an electric device placed outside the cooling liquid, producing an electric signal when the optical barrier is modified. The electric device can comprise a display and haptic means allowing to adjust one or several thresholds, as will be discussed, depending on at least one of the following parameters: the number of detected gas bubbles, the quality of a liquid in which the irrigation pipe is immersed, the thickness of the irrigation pipe, etc. According to this threshold(s), an electrical signal can be produced and sent to a digital control device. The digital control device can generate a warning signal when bubbles are detected. The warning signal can be, for example, a light signal and/or an acoustic signal enabling an operator to detect the occurrence and the origin of a malfunction of the pipes manufacturing device and/or to trigger a spool to be changed when a gas bubble is detected such that only a minimum amount of the manufactured pipe is lost. The warning signal can also be used to stop the extrusion line.

Advantageously the device for detecting holes in the wall of an irrigation pipe is located in proximity to the calibrator unit, which enables the occurrence of holes on the pipe walls to be detected early. The expression "in proximity" means as close as possible to the calibrator unit, or at a distance inferior to 50 mm from the calibrator unit. In fact as soon as a gas bubble escapes from the pipe, the device can immediately deduce that at least one hole is present on the pipe and generate a warning signal.

In one preferred embodiment the optical transmitter is placed facing the optical receiver, in order to optimize the light transmission. Advantageously the optical transmitter and receiver can comprise alignment and/or tilt screws for aligning and/or tilting the optical transmitter and receiver. An array of optical transmitters and receivers can be used to increase the length of the device and to make the gas bubble detection more effective.

One C-shaped piece or two U-shaped pieces support the optical transmitter and receiver and define a passageway for the irrigation pipe.

In one embodiment a system is used for cleaning the optical transmitter and receiver from static sticking of gas bubbles on their emitting respectively receiving parts. This system can comprise a nozzle injecting a fixed or an intermittent water jet and/or a vibrator. It is possible to define and regulate the flow of the water jet.

The cooling unit, as discussed, generally comprises a cover defining a cavity between the cooling liquid and the cover, in which a vacuum is created. Since the inner chamber of the pipe is subject to a gas pressure equal to the atmospheric pressure, the vacuum allows the tube to maintain the desired shape. For gas bubbles to emerge from the irrigation pipe, a pressure difference >=10 mbar has experimentally found to be sufficient.

The invention concerns also a method for detecting holes in the wall of an irrigation pipe comprising:

Defining an optical barrier by using at least one optical transmitter and at least one optical receiver, a first cable connected to this at least one optical transmitter, and a second cable connected to this at least one optical receiver, each of this first and second cables comprising one optical fiber or a beam of N optical fibers. Advantageously the optical transmitter, the optical receiver, the first cable and the second cable are arranged for being immersed in a cooling liquid.

Detecting a modification of the optical barrier caused by gas bubbles produced by the holes of the irrigation pipe.

The new solution has the advantage that it is considerably less expensive than the previous solutions and can be installed inside a cooling tank of any size.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
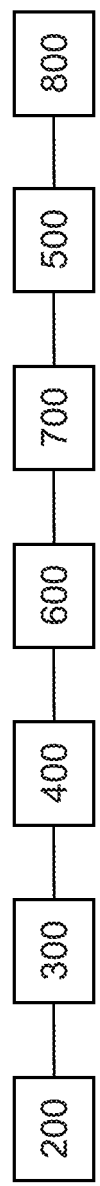
FIG. 1 is a block schematic of an example of a system for manufacturing a drip irrigation pipe.

FIG. 1 shows an example of a system for manufacturing a drip irrigation pipe. It comprises an extrusion unit 300 (including the extrusion head) performing an extrusion process, a calibrator unit 400 for regulating the diameter of the irrigation pipe, a cooling unit 600 for cooling the pipe—comprising a liquid cooling tank which is some tens meters long and a cooling liquid, e.g. water, inside the tank—and a traction unit 500 for drawing the pipe through the liquid cooling tank. The speed of the irrigation pipe inside the liquid cooling tank is generally higher than 100 m/min, e.g. 120 m/min. The thickness of the walls of the produced irrigation pipe is in the order of magnitude of few tens of millimeters, e.g. 0.15 mm.

Drippers can be regularly fed into the extrusion unit 300 by a dripper insertion unit 200 comprising orientating means for feeding the drippers to the extrusion unit 300 in a determined orientation.

After the cooling tank 600, a perforating unit 700 can be provided for making a hole in the wall of the pipe in correspondence of each dripper. Downstream of the traction unit 500, a winding unit 800 is provided for winding the pipe onto a spool.

Advantageously, as illustrated on FIGS. 2 to 5, the cooling unit 600 comprises a device for detecting holes in the wall of the irrigation pipe 100. This device is arranged for being immersed in the cooling liquid 30, this device for detecting holes comprising at least one optical transmitter 1 and at least one optical receiver 2 which define an optical barrier 10 between transmitter 1 and receiver 2. These holes can be formed for different reasons, e.g. the presence of dust in the extrusion unit, the inappropriate size of the carbon black present in the pipe material, the deposit of materials in the calibrator unit, other defects generated during the welding of the drippers, etc. These holes have generally a diameter between 0.1 mm and 1 mm and can be undetectable by the naked eye. The device for detecting holes is arranged so that holes 102 in the irrigation pipe 100 located below the device produce gas bubbles 102 which modify the optical barrier 10.

Figure 2:
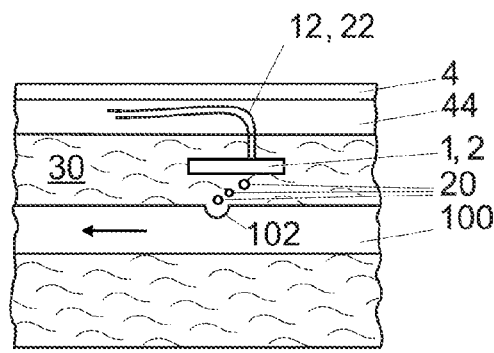
FIG. 2 shows a lateral cross-section view of one embodiment of the cooling unit of the system for manufacturing an irrigation pipe according to the invention, comprising one embodiment of the device for detecting holes in the wall of the irrigation pipe according to the invention.
Figure 3:
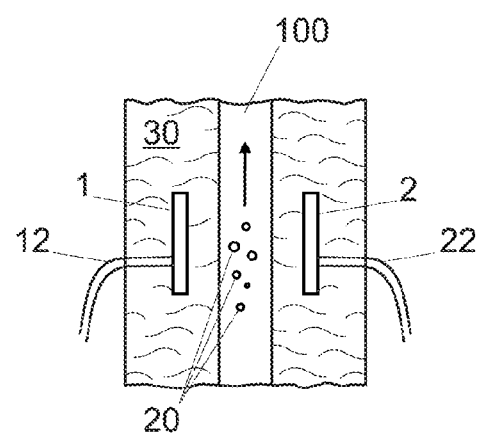
FIG. 3 shows a top view of the embodiment of the cooling unit and of the device for detecting holes in the wall of the irrigation pipe as shown in FIG. 2.
Figure 4:
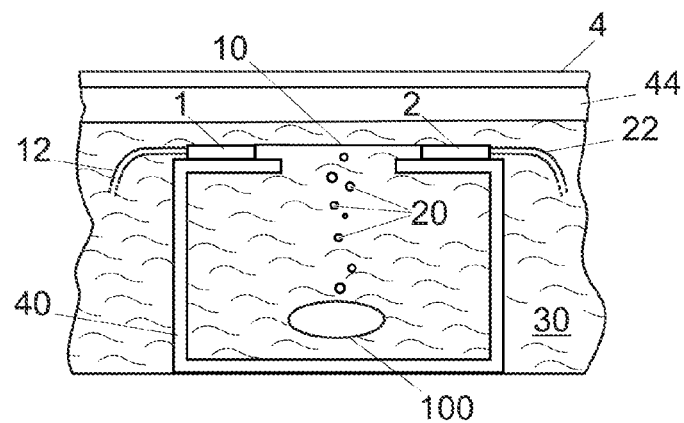
FIG. 4 shows a central cross-section of the embodiment of the cooling unit and of the device for detecting holes in the wall of the irrigation pipe, as shown in FIG. 2.

In vacuum calibration process, the liquid cooling tank generally comprises a cover 4, visible on FIGS. 2 and 4, which defines a cavity 44 between the liquid 30 and the cover 4, in which a partial vacuum is created. The inner chamber of the pipe is subject to a gas pressure equal to the atmospheric pressure. Due to this difference of pressure, if a hole 102 is present in the wall of the irrigation pipe 100, air bubbles raise from the pipe 100 toward the surface of the cooling liquid.

As discussed, the optical transmitter/receiver 1, 2 is a transmitter/receiver 1, 2 the input and output of which is an optical signal. In other words the optical transmitter 1 and receiver 2 do not comprise any electrical components: the optical transmitter 1 and receiver 2 are devoid of electrical components. The optical transmitter 1 and receiver 2 are adapted to be submerged in the cooling liquid 30 of the liquid cooling tank.

Suitable optical transmitter 1 and receiver 2 are manufactured by Baumer Holding AG, under the name of "FSE 20006Y02".

Figure 5:
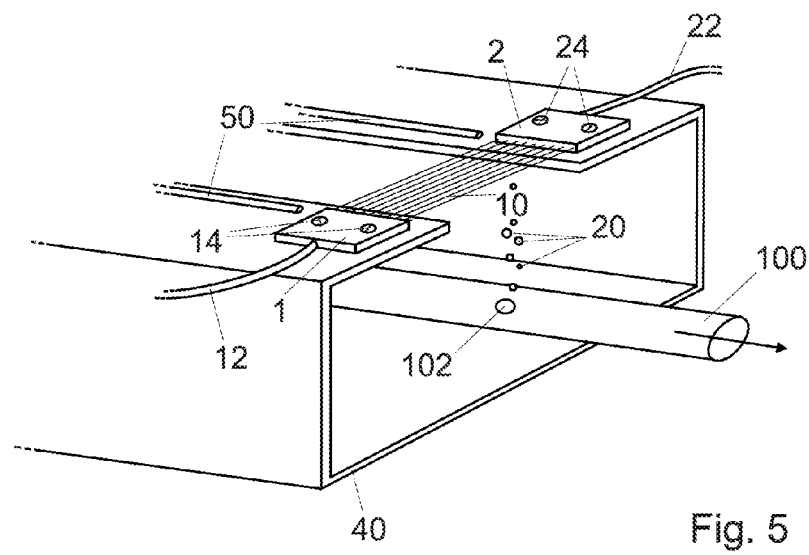
FIG. 5 shows a view in perspective of another embodiment of the cooling unit and of the device for detecting holes in the wall of the irrigation pipe, according to the invention.

The optical barrier 10, as illustrated on FIGS. 4 and 5, is then generated below the level of the cooling liquid 30 and above the level of pipe 100. The irrigation pipe 100, as discussed, is produced in a continuous process and is drawn by the traction unit 500, as indicated by the arrows on FIGS. 2, 3 and 5. If the irrigation pipe 100 comprises holes 102, gas bubbles 20 released from the holes 102 reach and cross the optical barrier 10 and consequently modify the light transmission characteristic for the flat light beam received by the optical receiver 2, since the gas bubbles 20 act as diffraction lenses, and therefore the intensity of the received flat light beam 10 is changed as the gas bubbles 20 cross it.

Advantageously the optical transmitter and receiver are respectively connected to a first and second cable 12, 22. Each cable 12, 22 can comprise a beam of N optical fibers, N being an integer and positive number, e.g. N=20. In another embodiment each of this first and second cable 12, 22 comprises a single optical fiber, in which different signals can be multiplexed by using WDM (Wavelength Division Multiplexing) techniques. The optical fiber or the beam of N optical fibers is arranged for conducting the light of a light source, e.g. a LED (e.g. red light at 60 nm) and/or a laser and/or an IR source.

Figure 6:
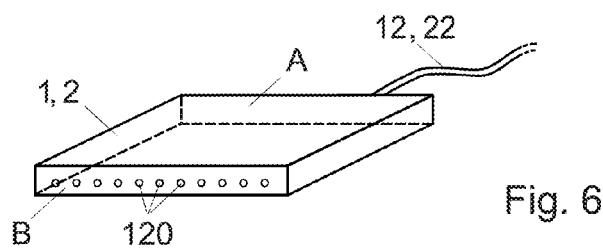
FIG. 6 shows a view of one embodiment of an optical transmitter or receiver belonging to the device for detecting holes in the wall of the irrigation pipe, according to the invention.

The optical transmitter and receiver, illustrated on FIG. 6, can have a parallelepiped shape and comprise a cable face A opposite to an emitting respectively receiving face B.

The cable face A comprises the connection to a first respectively second cable 12, 22, the emitting respectively receiving face B comprise one or more openings 120, the number of which corresponds to the number of optical fibers—or signals—of the first and second cables 12, 22.

If there are N optical fibers in the cables 12, 22—or if there is a single optical fiber comprising N wavelengths—the optical transmitter and receiver 1, 2 will comprise N openings 120 on the emitting respectively receiving face B, one for each optical fiber. In the case of the single optical fiber comprising N wavelengths, the optical transmitter 1 acts as a WDM demultiplexer which splits the N wavelengths into different signals corresponding to different wavelengths; the optical receiver 2 acts as WDM multiplexer which joins together these signals.

In one embodiment the optical transmitter and receiver 1, 2 comprise optical components, i.e. lens, mirrors, etc, for improving the transmission and/or the reception of the optical barrier if, for example, their distance is higher than some limiting value.

Figure 7:
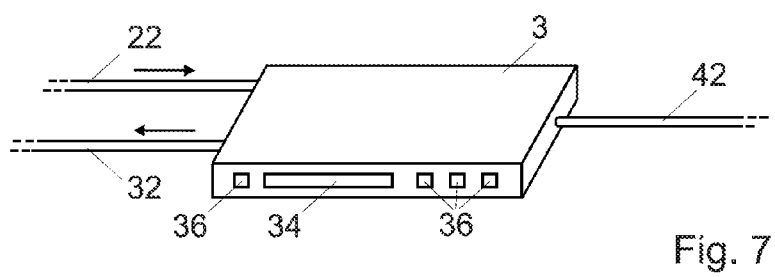
FIG. 7 shows a view of one embodiment of an electric device which can be connected to the device for detecting holes in the wall of the irrigation pipe, according to the invention.

The second cable 22 connects the optical receiver 2 to an electric device 3, illustrated on FIG. 7, placed outside the cooling liquid 30. The electric device 3 produces an electric signal 32 if the optical barrier 10 is modified. The electric device 3 can comprise a display 34 and haptic means 36 allowing to adjust a threshold or N thresholds depending on at least one of the following parameters: the number of detected gas bubbles 20, the quality of a liquid 30 in which the irrigation pipe 100 is immersed, the thickness of the irrigation pipe 100, etc. The expression "haptic means" indicates means which can perform a function once touched by a user or by a means such as a stylus. The electric device 3 comprises a power cable 42, e.g. a 24 V power cable.

The N thresholds can correspond to the N optical signals of the N optical fibers. These N thresholds can be added together: in this case a single threshold can be adjusted by the user.

Suitable electric devices 3 are manufactured by Baumer Holding AG, under the name of "FVK 10P67Y0/S35A".

The electric device 3, in this particular example, needs a calibrating phase before its use, during which it learns about the optical barrier 10 in the absence of gas bubbles 20. One or more thresholds are then manually or automatically defined depending on the difference measured by the optical receiver 2 if one or more gas bubbles 20 are present, compared to the absence of gas bubbles.

According to this threshold(s), an electric signal 32 can be produced and sent to a digital control device not illustrated. The digital control device can then generate a warning signal. The warning signal can be, for example, a light signal and/or an acoustic signal enabling an operator to detect the occurrence and the origin of a malfunction of the pipes manufacturing device and/or to trigger a spool to be changed when a gas bubble 20 is detected in order to lose a minimum length of the manufactured pipe.

In another embodiment it is possible to identify the position(s) of the detected hole(s) by making a measurement of the length of the irrigation pipe 100. Depending on the found position(s) it is then possible to discard the defective irrigation pipe 100 and/or keep the non defective pipe obtaining a spool smaller than the scheduled spool.

Advantageously the device for detecting holes in the wall of an irrigation pipe is placed in proximity to the calibrator unit 400, which enables the appearance of holes 102 on the pipe walls to be detected early. In fact as soon as a gas bubble 20 escapes from the pipe 100, the device can immediately deduce that at least one hole 102 is present on the pipe 100 and generate a warning signal.

In one preferred embodiment the optical transmitter 1 is placed in front of the optical receiver 2, in order to optimize the light transmission. Advantageously the optical transmitter 1 and receiver 2 can comprise alignment and/or tilt screws 14, 24, visible on FIG. 5, for aligning and/or tilting the optical transmitter 1 and receiver 2. For example a micrometric regulating screw and two locking screws can be used.

An array of optical transmitters and receivers 1, 2 can be used for augmenting the length of the device and making the gas bubbles detection more effective.

One C-shaped piece 40, visible on FIGS. 4 and 5, supports the optical transmitter 1 and receiver 2 and define a passageway for the irrigation pipe 100. This piece 40 can be fixed to the liquid cooling tank, e.g. by some screws. In another embodiment two U-shaped pieces can be used, one for the optical transmitter 1 and another one for the optical receiver 2. In this last case however the alignment of the optical transmitter 1 with the optical receiver 2 is more complicated.

In one embodiment a system is used for cleaning the optical transmitter and receiver 1, 2 from static sticking of gas bubbles on their emitting respectively receiving faces B. This system can comprise two nozzles 50, connected to the piece 40, injecting a fixed or an intermitted water jet, e.g. a water jet each minute, and/or a vibrator, a brush, an ultrasound generator etc. It is possible to define and adjust the flow of the water jet. Use of a water jet for cleaning the transmitter and receiver is advantageous since it does not require immersion of any electrical part.

The cooling unit 600, as discussed, generally comprises a cover 4 defining a cavity 44 between the cooling liquid 30 and the cover 4, in which a partial vacuum is created. For gas bubbles 20 to escape from the irrigation pipe, a pressure difference >=10 mbar between the cavity 44 and the inside of the pipe 100 has experimentally found to be sufficient. It has been experimentally verified that a vacuum >10 mbar in the cavity 44 allows the gas bubbles 20 to go out from the pipe 100.

According to one embodiment of the invention the system can comprise a bubble collector for collecting gas bubbles 20, e.g. a hood. In this case, since the gas bubbles are guided to the device for detecting holes 102 by a predetermined passageway, the use of two or more optical transmitters 1 and receivers 2 for having a more effective gas bubble detection can be avoided.

The detection of a gas bubble 20, and then of a possible hole 102, is nearly instantaneous. The warning signal is generated after a delay of less than one second due to the time needed for processing the electric signal 32 generated by the electric device 3.

According to a preferred embodiment, the device according to the invention can be used for checking the cooling liquid quality, e.g. its optical conductibility. It is then possible for example to have a separate warning signal depending on this quality and to adjust the corresponding threshold(s) daily.

REFERENCE NUMBERS USED ON THE FIGURES

1 Optical transmitter
2 Optical receiver
3 Electric device
4 Cover of the cooling liquid tank
10 Optical barrier
12 First cable
14 Alignment and/or tilt screws of the optical transmitter
20 Gas bubble
22 Second cable
24 Alignment and/or tilt screws of the optical receiver
30 Cooling liquid
32 Electric signal
34 Display of the electric device
36 Haptic means of the electric device
40 C-shaped piece
42 Power cable of the electric device
44 Cavity of the liquid cooling tank
50 Nozzle for cleaning the optical transmitter and receiver
100 Irrigation pipe
102 Hole in the wall of the irrigation pipe
120 Opening of the optical transmitter/receiver
200 Dripper insertion unit
300 Extrusion unit
400 Calibrator unit
500 Traction unit
600 Cooling unit
700 Perforation unit
800 Winding unit
A Cable face of the optical transmitter/receiver
B Emitting respectively receiving face of the optical transmitter/receiver

What is claimed is:

1. A system for manufacturing an irrigation pipe comprising
   an extrusion unit for extruding said irrigation pipe,
   a calibrator unit for regulating the diameter of said irrigation pipe,
   a cooling unit for cooling said irrigation pipe in a cooling liquid,
   a traction unit for drawing the irrigation pipe in said cooling unit, said cooling unit comprising a device for detecting holes in a wall of said irrigation pipe and arranged for being immersed in the cooling liquid, said device for detecting holes comprising:
   at least one optical transmitter and at least one optical receiver which define an optical barrier,
   said device for detecting holes being arranged so that holes in a wall of said irrigation pipe which is located below said device can produce gas bubbles which can modify said optical barrier.

2. The system of claim 1, said device for detecting holes comprising a first cable connected to said at least one optical transmitter, and second cable connected to said at least one optical receiver, each of said first and second cables comprising one or more optical fibers, said optical fiber or a beam of N optical fibers being arranged for conducting the light of a LED and/or a laser and/or an IR source.

3. The system of claim 1, said at least one optical transmitter and said at least one optical receiver being devoid of electric components.

4. The system of claim 2, said device for detecting holes being arranged to be connected to an electric device outside the cooling liquid, said electric device being connected to said at least one optical receiver by said second cable, said electric device being configured to produce an electric signal if said optical barrier is modified.

5. The system of claim 4, said electric device allowing to adjust a threshold or N thresholds depending on at least one of the following parameters: the number of detected gas bubbles, the quality of the cooling liquid in which said irrigation pipe is immersed, the thickness of said irrigation pipe.

6. The system of claim 1, said device for detecting holes being placed in proximity to said calibrator unit.

7. The system of claim 1, said at least one optical transmitter being placed in front of said at least one optical receiver.

8. The system of claim 1, comprising one C-shaped piece or two U-shaped pieces defining a passageway for said irrigation pipe and being the support for said at least one optical transmitter and said at least one optical receiver.

9. The system of claim 1, comprising a system for cleaning gas bubbles from said at least one optical transmitter and said at least one optical receiver.

10. The system of claim 9, said system comprising a nozzle and/or a vibrator.

11. The system of claim 1, said at least one optical transmitter and said at least one optical receiver comprising alignment and/or tilting screws for aligning said at least one optical transmitter with said at least one optical receiver.

12. The system of claim 1, said cooling unit comprising a cover defining a cavity above said cooling liquid, said cavity having a vacuum higher than 10 mbar.

13. The system of claim 1, said at least one optical transmitter and said at least one optical receiver comprising optical components for improving the transmission and/or the reception of said optical barrier.

14. The system of claim 1, comprising a dripper insertion unit comprising orienting means for feeding drippers to said extrusion unit along a determined orientation.

* * * * *

UNITED STATES PATENT AND TRADEMARK OFFICE
CERTIFICATE OF CORRECTION

PATENT NO.         : 9,022,764 B2                                    Page 1 of 1
APPLICATION NO.    : 14/116173
DATED              : May 5, 2015
INVENTOR(S)        : Alain Wisler It is certified that error appears in the above-identified patent and that said Letters Patent is hereby corrected as shown below:

In the specification,

Column 5, line 53, replace "20006Y02" with -- 200C6Y02 --

Signed and Sealed this
Fifth Day of January, 2016

Michelle K. Lee
*Director of the United States Patent and Trademark Office*